United States Patent [19]

Seki

[11] Patent Number: 4,882,006
[45] Date of Patent: Nov. 21, 1989

[54] SYSTEM FOR STRETCHING AND SEVERING STRIP-LIKE RESIN SHEET

[75] Inventor: Shingo Seki, Osaka, Japan

[73] Assignee: Nippon Sheet Glass Co., Ltd., Japan

[21] Appl. No.: 134,291

[22] Filed: Dec. 17, 1987

[30] Foreign Application Priority Data

Dec. 23, 1986 [JP] Japan ............................. 61-202222[U]
Dec. 23, 1986 [JP] Japan ............................. 61-202223[U]

[51] Int. Cl.$^4$ ............................................. B29C 43/24
[52] U.S. Cl. ......................................... 156/504; 26/51;
26/72; 83/410; 242/58.6; 425/366
[58] Field of Search ............... 156/495, 496, 502, 504,
156/507; 264/145, 151, 160; 425/66, 108, 505,
514, 302.1, 329, 366; 83/410, 411 R, 439, 444,
733, 156, 161; 242/58, 58.6, 78.8, 79; 198/468.4,
468.6; 26/51, 72

[56] References Cited

U.S. PATENT DOCUMENTS

| | | | |
|---|---|---|---|
| 1,261,056 | 4/1918 | Pfohl | 242/58 |
| 3,639,194 | 2/1972 | Plunkett et al. | 156/552 |
| 3,885,899 | 5/1975 | Gurta et al. | 425/366 |
| 4,386,741 | 6/1983 | Weiss et al. | 242/58.6 |
| 4,554,713 | 11/1985 | Chabal | 425/366 |
| 4,600,465 | 7/1986 | Delannoy | 156/494 |

FOREIGN PATENT DOCUMENTS 6930236 11/1969 Fed. Rep. of Germany.
2534931 2/1976 Fed. Rep. of Germany.
53-16027 5/1978 Japan.

Primary Examiner—Jill L. Heitbrink
Attorney, Agent, or Firm—Scherlacher, Mok & Roth

[57] ABSTRACT

A system stretches and severs a strip-like resin sheet unwound from a sheet roll to produce a product of a prescribed shape, the system having a stretching device having forming members for stretching the strip-like resin sheet into a fan-shaped resin sheet. The system includes a device disposed downstream of the stretching device for severing the fan-shaped resin sheet on cutting edges, and a feeding device disposed downstream of the severing device for feeding the product to a prescribed area. The system further includes a conveyor for conveying a preceding sheet roll nonrotatably to an unwinding position upstream of the stretching device, a pinch roller disposed downstream of the unwinding position for unwinding the strip-like resin sheet from the preceding sheet roll, a suction delivery device for pulling the leading end of a resin sheet on a next sheet roll to a splicing position positioned between the pinch roller and the unwinding position, and a splicing device for splicing the leading end of the resin sheet from the next sheet roll to the trailing end of the resin sheet from the preceding sheet roll in the splicing position.

8 Claims, 8 Drawing Sheets

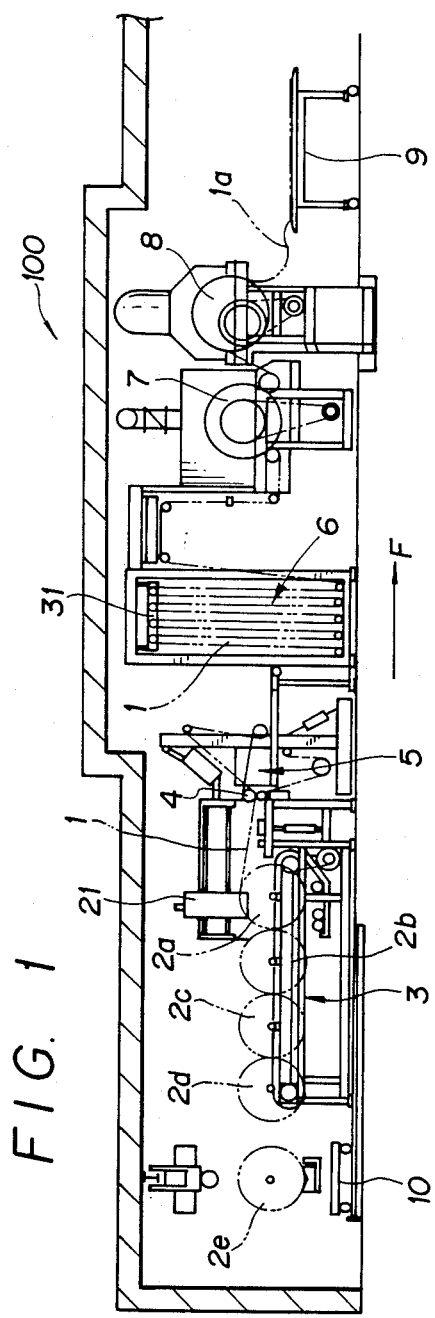
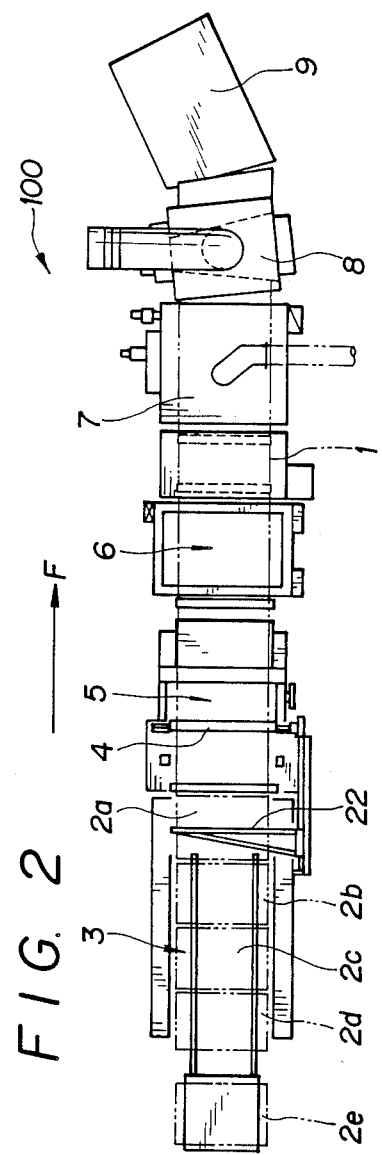

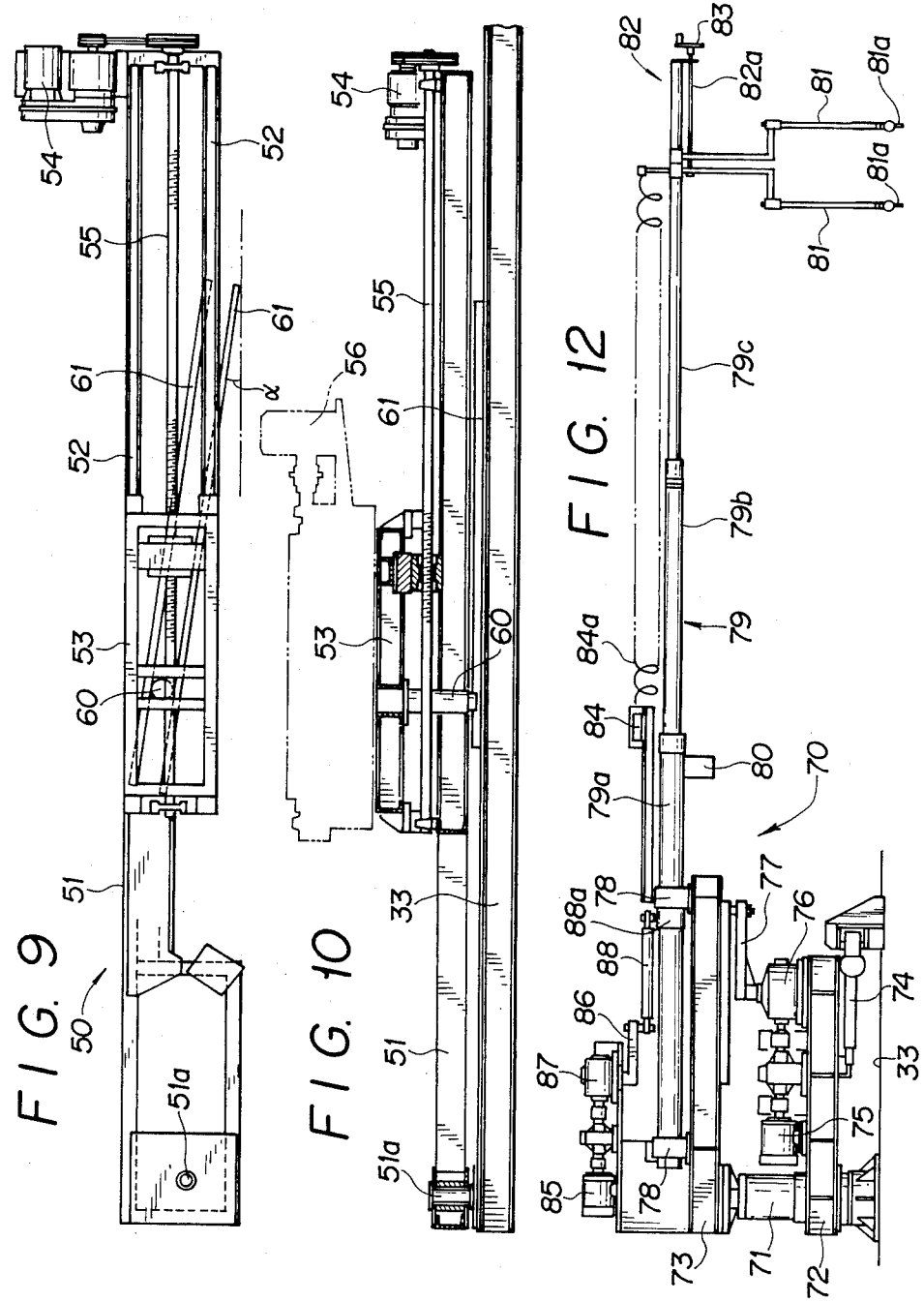

SYSTEM FOR STRETCHING AND SEVERING STRIP-LIKE RESIN SHEET

BACKGROUND OF THE INVENTION

1. Field of the Invention

The present invention relates to a system for stretching and severing a strip-like resin sheet, and more particularly to a system for stretching a strip-like resin sheet into a fan shape and thereafter cutting off the sheet to prescribed dimensions.

2. Description of the Relevant Art

Recent automotive windshields are made up of laminated glass comprising two glass sheets bonded together with an intermediate film of polyvinyl butyral therebetween.

The intermediate film is produced by cutting off a strip-like resin sheet having a constant width. Such a strip-like resin sheet may be severed to the same shape as the overall shape of desired laminated glass, but any resulting scraps will be useless. If the strip-like resin sheet to be cut off includes a glare-resistant gradient band on one side thereof, the gradient band will be cut off so that it will have different widths at its center and opposite ends at the time of severing the strip-like resin sheet.

Japanese Patent Publication No. 53-16027 published May 29, 1987 discloses an apparatus for heat-softening a strip-like resin sheet unwound from a sheet roll, then stretching the sheet to a fan shape on a conical drum, and finally cutting off the fan-shaped sheet to the entire shape of automotive laminated glass. According to the disclosed apparatus, the resin sheet can efficiently be cut off and used.

However, the disclosed apparatus is poor in its efficiency since the resin sheet is cut off manually. More specifically, the fan-shaped resin sheet as it leaves the conical drum is delivered onto a base table and then cut off by a manually operated cutting machine to a desired shape which is used as an intermediate film. The intermediate film is then manually stacked on a stock table. Therefore, two workers are needed to operate the cutting machine and to stack the severed intermediate film. The manual cutting process tends to develop errors with respect to the dimensions of the severed intermediate film. The manual stacking procedure is liable to cause the intermediate film to be wrinkled when it is stacked.

In apparatus for cutting off strip-like resin sheets to given shape, which may include the aforesaid disclosed apparatus, the resin sheet is pulled from a sheet roll by pinch rollers and then cut off. For continuous operation, when the resin sheet from one sheet roll is consumed, the leading edge of the resin sheet from another sheet roll must be spliced to the trailing end of the resin sheet in use. Heretofore, the splicing process has been effected manually. In the manual splicing process, alcohol is first applied by the worker to the trailing end of the preceding resin sheet, the leading end of the next resin sheet is placed on the trailing end of the preceding resin sheet, and then the overlapping ends of the resin sheets are manually pressed together to join the resin sheets. The manual splicing procedure is therefore complex and low in efficiency, and also requires an air ventilation system.

The present invention has been made in an effort to eliminate the aforesaid drawbacks of the conventional apparatus for stretching and severing a strip-like resin sheet.

SUMMARY OF THE INVENTION

It is a first object of the present invention to provide a system for stretching and severing a strip-like resin sheet with increased efficiency.

A second object of the present invention is to provide a system for stretching and severing a strip-like resin sheet, the system being capable of splicing the leading end of a next resin sheet efficiently to the trailing end of a preceding resin sheet.

To achieve the first object, there is provided a system for stretching and severing a strip-like resin sheet unwound from a sheet roll in a first direction to produce a product of a prescribed shape, the system comprising a support base movable in a second direction transverse to the first direction, a stretching device mounted on the support base and having forming members for stretching the strip-like resin sheet into a fan-shaped resin sheet, a severing device mounted on the support base downstream of the stretching device in the first direction for severing the fan-shaped resin sheet on cutting edges into the product, the severing device being angularly movable in a horizontal plane to align the cutting edges with a radial direction of the fan-shaped resin sheet in response to movement of the support base in the second direction, and a feeding device mounted on the support base downstream of the severing device in the first direction for feeding the product to a prescribed area, the feeding device having an extensible/contractible arm supporting a chuck for gripping the leading end of the fan-shaped resin sheet and rotatable in a horizontal plane.

The system further includes a conveyor for conveying a preceding sheet roll nonrotatably to an unwinding position upstream of the stretching device in the first direction, a pinch roller disposed downstream of the unwinding position in the first direction for unwinding the strip-like resin sheet from the preceding sheet roll, the conveyor being capable of conveying a next sheet roll to the unwinding position when the resin sheet on the preceding sheet roll is about to be used up, a suction delivery device for pulling the leading end of a resin sheet on the next sheet roll which has been conveyed to the unwinding position, to a splicing position positioned between the pinch roller and the unwinding position, and a splicing device disposed in the splicing position for splicing the leading end of the resin sheet from the next sheet roll to the trailing end of the resin sheet from the preceding sheet roll in the splicing position.

To achieve the second object, there is provided a system for stretching and severing a strip-like resin sheet unwound from a sheet roll in a first direction to produce a product of a prescribed shape, the system comprising a support base movable in a second direction transverse to the first direction, a stretching device mounted on the support base and having forming members for stretching the strip-like resin sheet into a fan-shaped resin sheet, a conveyor for conveying a preceding sheet roll nonrotatably to an unwinding position upstream of the stretching device in the first direction, a pinch roller disposed downstream of the unwinding position in the first direction for unwinding the strip-like resin sheet from the preceding sheet roll, the conveyor being capable of conveying a next sheet roll to the unwinding position when the resin sheet on the preceding sheet roll is about to be used up, a suction delivery device for pulling the leading end of a resin sheet on the next sheet roll which has been conveyed to the unwinding position, to a splicing position positioned between the pinch roller and the unwinding position, and a splicing device disposed in the splicing position for splicing the leading end of the resin sheet from the next sheet roll to the trailing end of the resin sheet from the preceding sheet roll in the splicing position.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 1 is a front elevational view of a system for stretching and severing a strip-like resin sheet according to a preferred embodiment of the present invention;

FIG. 2 is a plan view of the system;

FIG. 9 is a plan view of a device for severing a resin sheet;

FIG. 10 is a side elevational view of the device for severing a resin sheet;

FIG. 12 is a side elevational view of a feeding device.

DETAILED DESCRIPTION OF THE PREFERRED EMBODIMENT

Figure 3:
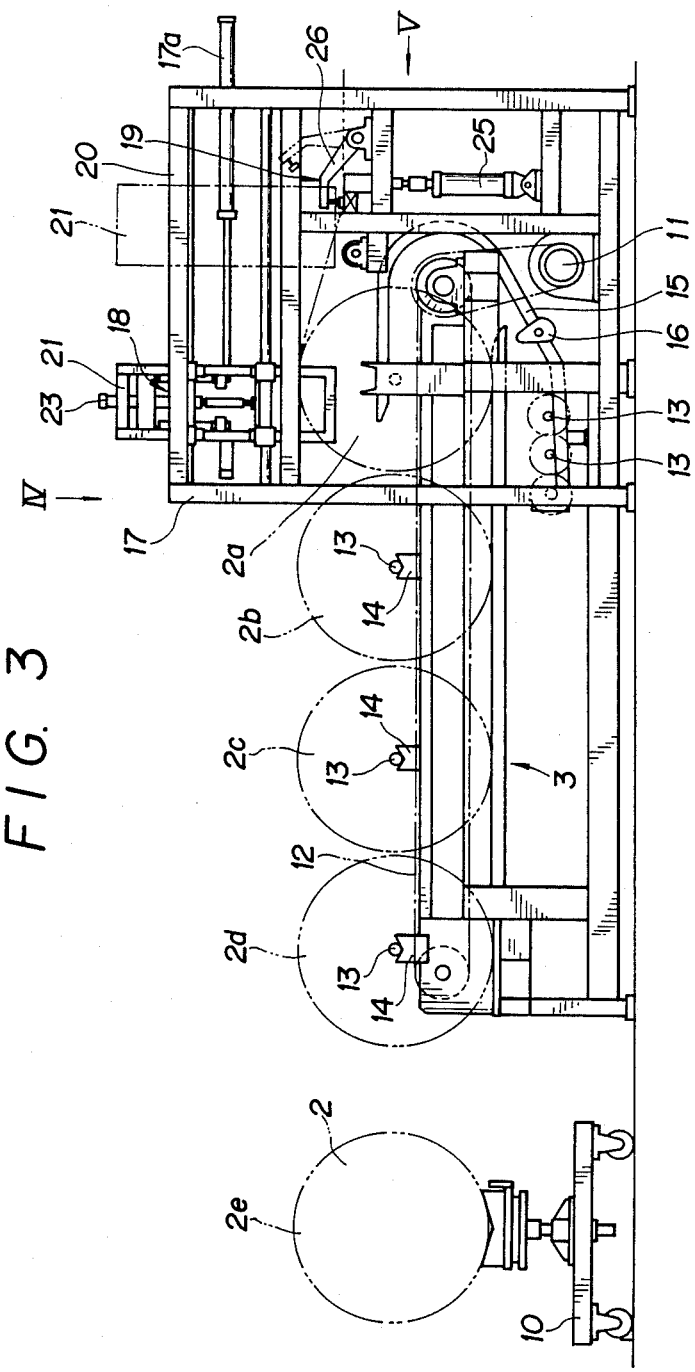
FIG. 3 is an enlarged front elevational view of the system, showing a region where a resin sheet is unwound.
Figure 4:
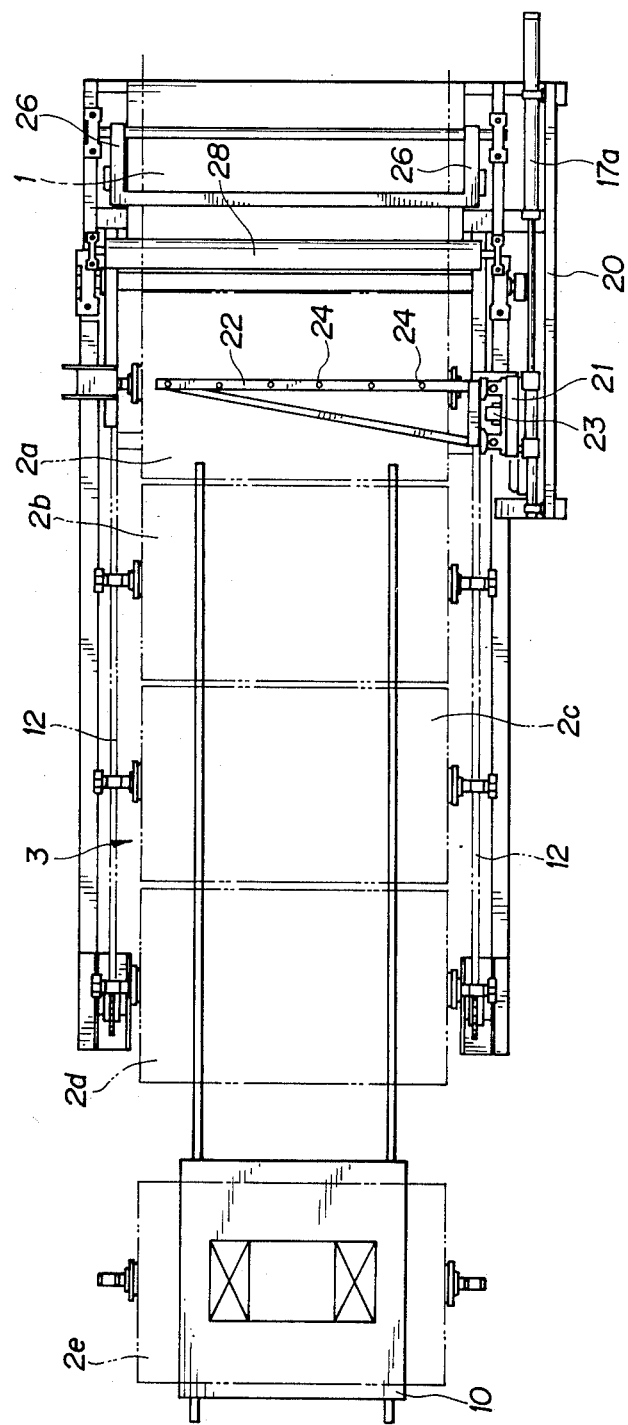
FIG. 4 is a view as viewed in the direction of the arrow IV in FIG. 3.

As shown in FIGS. 1 and 2, a system, generally designated by the reference numeral 100, for stretching and severing a strip-like resin sheet according to a preferred embodiment of the present invention. The strip-like resin sheet, denoted at 1, to be stretched and severed by the system 100 may preferably be a film of polyvinyl butyral used as the intermediate film of an automotive laminated glass sheet (not shown). The resin sheet 1 is fed through the system 100 in the direction of the arrow F.

The stretching and severing system 100 includes a conveyor 3 disposed in its most upstream position, with respect to the direction F of feed, for feeding a sheet roll 2 of a resin sheet 1 to an unwinding position. An unwinding device 5 is located downstream of the conveyor 3 and has pinch rollers 4 for unwinding the sheet 1 from the sheet roll 2. An accordion device 6 is disposed downstream of the unwinding device 5 for storing the unwound resin sheet 1 for a prescribed period of time. More specifically, the accordion device 6 has a plurality of upper and lower guide rollers for alternately guiding and feeding out the sheet 1. The accordion device 6 is followed by a downstream heating device 7 for heating the sheet 1. The system 100 also includes a stretching device 8 disposed downstream of the heating device 7 for longitudinally stretching one side edge of the resin sheet 1 at a rate greater than the other side edge thereof thereby to produce a fan-shaped resin sheet. The system 100 further has a stock table 9 situated downstream of the stretching deivce 8 for placing thereon an intermediate film 1a which has been cut off from the fan-shaped resin sheet 1.

A device for splicing the leading end of a next resin sheet 1 to the trailing end of a preceding resin sheet 1 will be described with reference to FIGS. 3 through 6.

As shown in FIG. 3, a foremost sheet roll 2a is located in the unwinding position, and successive sheet rolls 2b, 2c, 2d are placed on the conveyor 3. A roll carriage 10 is located upstream of the conveyor 3 for carrying a sheet roll 2e to the conveyor 3. The conveyor 3 includes a chain 12 which is reciprocally driven by a motor 11. A plurality of pairs of core rests 14 are attached at spaced intervals to the chain 12 for supporting cores 13 of the respective sheet rolls 2 (indicated here as 2a, 2b, 2c, 2d). Each of the sheet rolls 2 is transferred from the roll carriage 10 onto one pair of core rests 14 while the leading end of the resin sheet being positioned on the top of the sheet roll 2. The sheet roll 2 is then nonrotatably fed to the unwinding position (indicated by 2a) by the conveyor 3.

Guide rails 15 are disposed at the front end of, i.e., just downstream of the conveyor 3 for allowing a core 13 to rotate and drop by gravity therealong. Spring-biased stoppers 16 are attached to intermediate portions of the guide rails 15 for slowing down the core 13 as it drops down the guide rails 15.

A frame 17 is vertically disposed in the unwinding position and supports a suction delivery device 18 and a splicing device 19.

The suction delivery device 18 has a movable body 21 held in engagement with a guide rod 20 mounted on the frame 17 in the direction F of feed. The movable body 21 is movable along the guide rod 20 by a cylinder unit 17a mounted on a front portion of the frame 17. The movable body 21 has an arm 22 extending over the sheet roll 2a and supporting a plurality of suction pads 24 attached to a lower surface thereof. The arm 22 is vertically movable by a cylinder unit 23 mounted on the movable body 21.

The splicing device 19 is disposed upstream of the pinch rollers 4 and has a pair of arms 26 which is vertically angularly movable by respective cylinder units 25, with heaters 27 (FIG. 6) being mounted on the distal ends of the arms 26.

A bend roller 28 is disposed upstream of the splicing device 19 for guiding the sheet 1 to protect the same against abutting engagement with the frame 17 when the remaining length of the sheet 1 on the sheet roll 2a is reduced When a sheet roller with its resin sheet wound in the opposite direction to that shown is used, the bend roller 28 serves to guide the resin sheet from such a sheet roller at all times.

When the sheet 1 on the foremost sheet roll 2a is about to be used up, the leading end of the sheet 1 on the next sheet roll 2b is spliced to the trailing end of the sheet 1 on the sheet roll 2a in the following manner:

As described above, each of the sheet rolls 2 is transferred from the roll carriage 10 onto one pair of core rests 14 of the conveyor 3 while the leading end of the strip-like sheet 1 is in the uppermost position. The sheet rolls 2 are nonrotatably conveyed successively to the unwinding position by the conveyor 3.

At the time the sheet 1 on the foremost sheet roll 2a is just used up, the core 13 of the sheet roll 2a is allowed to rotate and drop down the guide rails 15. At this time, the motor 11 is energized to move the core 13 forwardly over a prescribed distance to feed the next sheet roll 2b to the position where the preceding sheet roll 2a was present.

Figure 6:
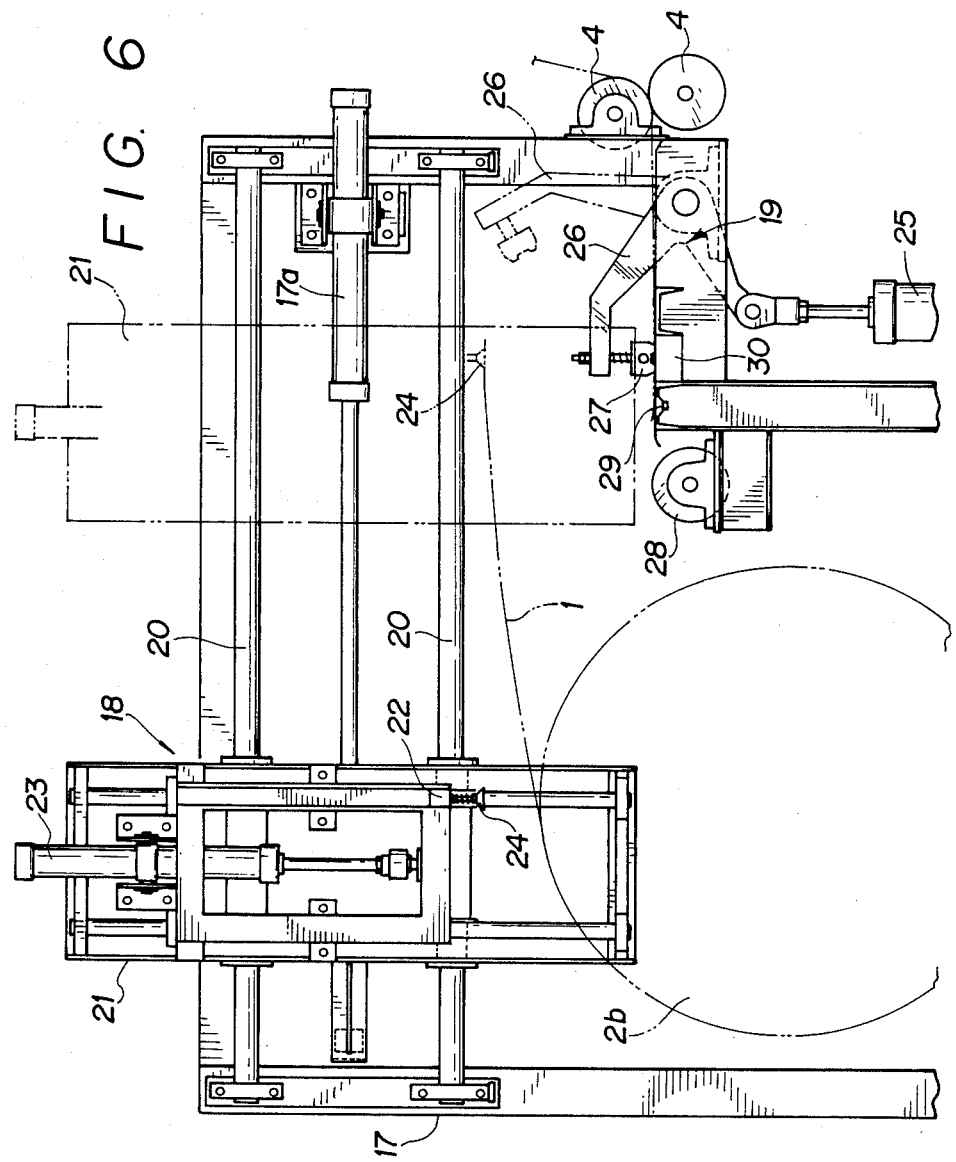
FIG. 6 is an enlarged fragmentary view of FIG. 3.

Then, as illustrated in FIG. 6, the trailing end of the preceding sheet 1 as it moves past the bend roller 28 is detected by a photosensor 29, which enables a control unit (not shown) to stop the rotation of the pinch rollers 4. The preceding sheet 1 is now stopped, and the trailing end thereof is placed on an anvil base 30. At the same time, a support bar 31 (FIG. 1) on which the upper guide rollers of the accordion device 6 are rotatably supported is lowered to permit the sheet 1 to be fed to the heating device 7 and the stretching device 8 uninterruptedly. The support bar 31 will be moved back upwardly at an appropriate time.

Concurrent with the above process, the leading end of the sheet 1 on the next sheet roll 2b is pulled out to the splicing position by the suction delivery device 18. More specifically, the movable body 21 is first positioned directly above the next sheet roll 2b by the cylinder unit 17a on the frame 17, and then the arm 22 is caused to descend by the cylinder unit 23 on the movable body 21. The leading end of the sheet 1 on the following roll 2b is now attracted by the suction pads 24 on the arm 22. Thereafter, the cylinder unit 23 is actuated again to lift the suction pads 24. The cylinder unit 17a is operated again to move the movable body 21 to position the suction pads 24 immediately above the anvil base 30, so that the leading end of the sheet 1 on the next sheet roll 2b is pulled to a position above the anvil base 30. The cylinder unit 23 is actuated again to lower the suction pads 24 to put the leading end of the next sheet 1 on the trailing end of the preceding sheet 1. Then, the next sheet 1 is released from the suction pads 24, which are thereafter elevated. The cylinder units 25 are actuated to turn the arms 26 downwardly to cause the heaters 27 on the arms 26 to heat and fuse the leading end of the next sheet 1 and the trailing end of the preceding sheet 1 under pressure Thereafter, the swingable arms 26 are turned upwardly to move the heaters 27 away from the spliced ends of the sheets 1, and the spliced ends are left about 10 seconds so as to be cooled When the resin sheets 1 are completely bonded together, the pinch rolls 4 are rotated again to feed the sheet 1.

The above cycle is repeated to continuously supply the strip-like resin sheet 1 to the heating device 7 and the stretching device 8.

After the resin sheet 1 has been heated by the heating device 7, it is stretched and cut off to a prescribed shape and prescribed dimensions, and the severed sheet is placed on the stock table 9. These processes will be described with reference to FIGS. 7 through 12.

Figure 7:
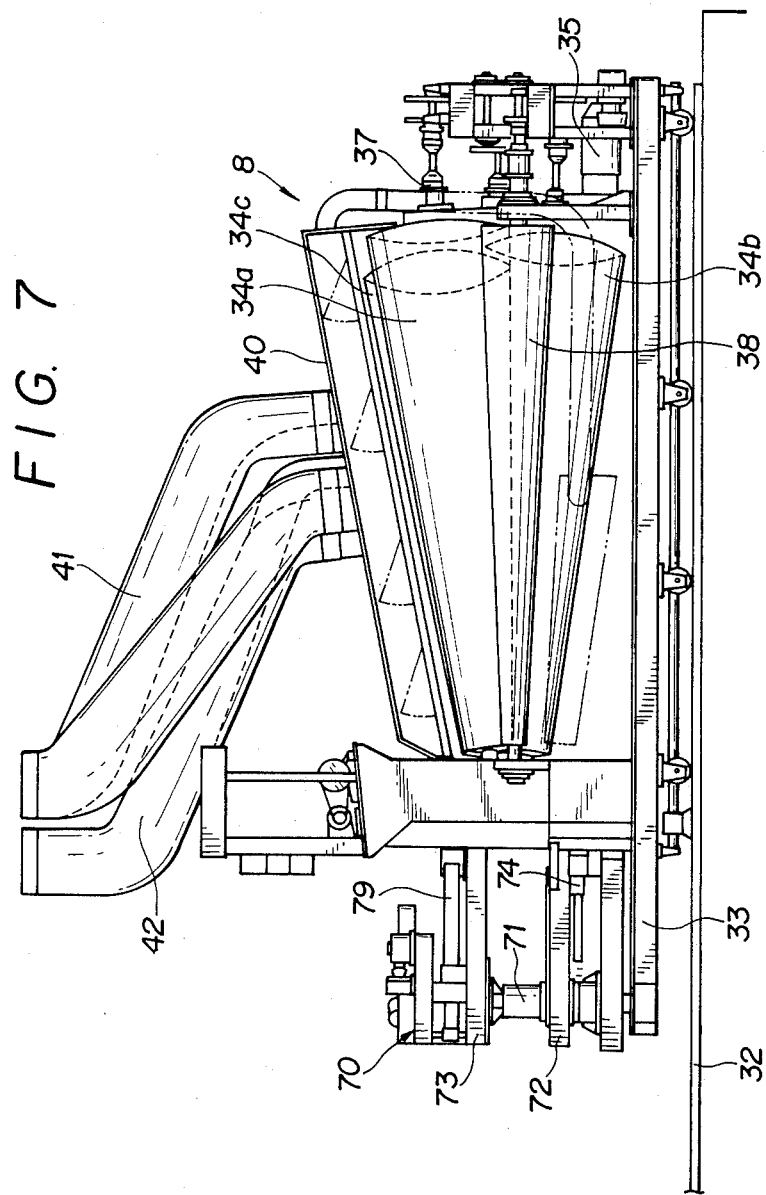
FIG. 7 is a front elevational view of a device for stretching a resin sheet.
Figure 8:
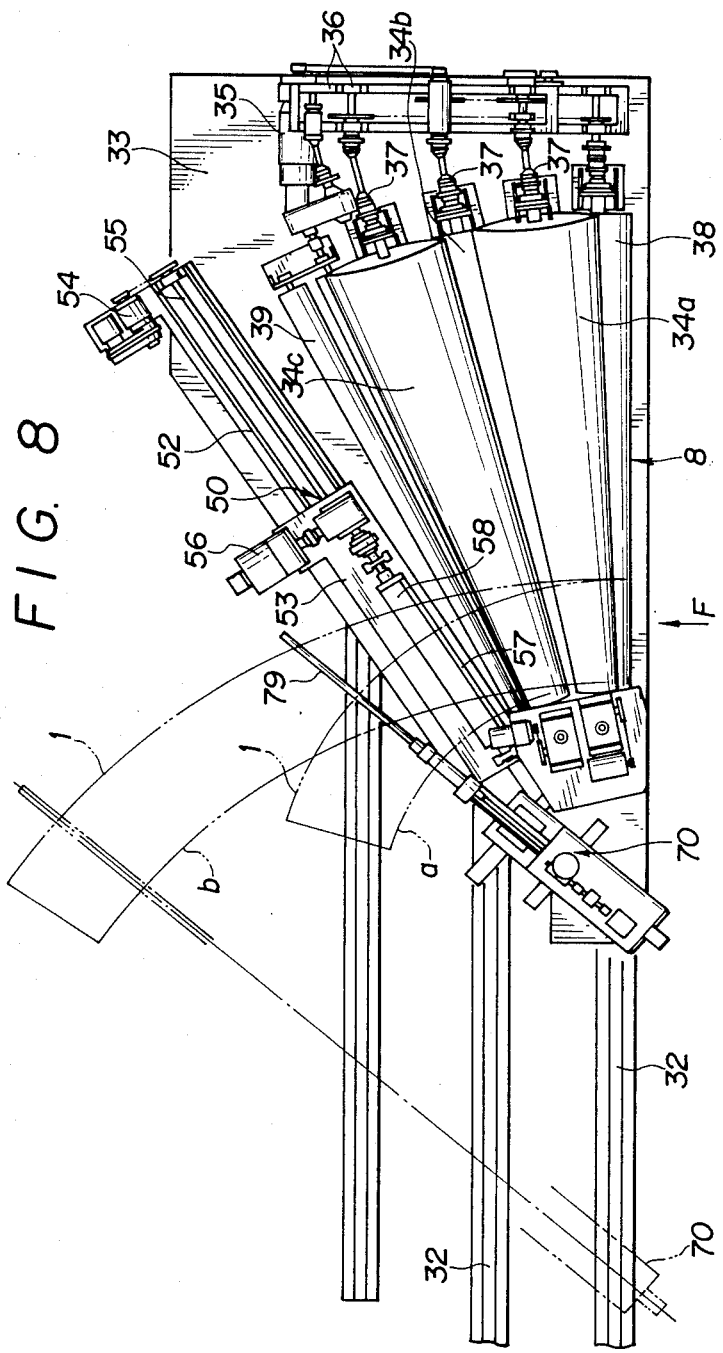
FIG. 8 is a plan view of the device for stretching a resin sheet.

As shown in FIGS. 7 and 8, the stretching device 8 has a support base 33 movably supported on rails 32 extending perpendicularly to the direction F of feed of the strip-like resin sheet 1. The heating device 7 is fixed in position.

On the support base 33, there are successively arranged three conical drums 34a, 34b, 34c which are rotated at an equal speed by a motor 35, gears 36, and universal joints 37. The conical drums 34a, 34b, 34c have central axes extending substantially perpendicularly to the direction F of feed. Guide rollers 38, 39 are disposed upstream and downstream, respectively, of the conical drums 34a, 34b, 34c. The guide roller 38 serves to guide the strip-like resin sheet 1 having moved past the heating device 7 to the conical drums 34a, 34b, 34c. The guide roller 39 serves to deliver the resin sheet 1 as it is stretched into a fan shape by the conical drums 34a, 34b, 34c to a severing device 50. A feeding device 70 is also disposed on the support base 33 for moving an intermediate film 1a as cut off to desired dimensions by the severing device 50 onto the stock table 9.

As shown in FIG. 7, the upper surfaces of the conical drums 34a, 34b, 34c are covered with a casing 40 connected to a cooling air supply duct 41 and an air discharge duct 42. A cooling medium such as glycol is circulated through the conical drums 34a, 34b, 34c.

The resin sheet 1 which is heat-softened by the heating device 7 is stretched by the conical drums 34a, 34b, 34c while the resin sheet 1 is being successively wound around the conical drums 34a, 34b, 34c. Due to the outer conical shapes of the conical drums 34a, 34b, 34c, the resin sheet 1 is longitudinally stretched at a greater rate on one side edge than on the other side edge. The sheet 1, when it has moved past the conical drums 34a, 34b, 34c, is of a fan shape devoid of a central area.

As described above, the support base 33 is movable along the rails 32 in a direction normal to the direction F of feed of the sheet 1 before it is stretched. Therefore, by moving the support base 33 along the rails 32, the radius of curvature of the resin sheet 1 to be stretched to a fan or arcuate shape can freely be adjusted. More specifically, when the support base 33 and the severing device 50 are positioned as indicated by the solid lines in FIG. 8, the sheet 1 is stretched by smallest-diameter portions of the conical drums 34a, 34b, 34c. Thus, the fan-shaped sheet 1 after it has been stretched has a smallest radius of curvature, as indicated at a. At this time, the severing device 50 indicated by the solid lines is positioned in a position to sever the sheet 1. When the support base 33 is in the leftmost position indicated by the dot-and-dash lines in FIG. 8, the sheet 1 is stretched by largest-diameter portions of the conical drums 34a, 34b, 34c. Therefore, the fan-shaped sheet 1 after it has been stretched has a largest radius of curvature, as indicated at b. At this time, the severing device 50 has been moved upwardly to the right along guide rails 52 (described later on) into a position to sever the sheet 1.

The severing device 50 will now be described with reference to FIGS. 9 and 10.

The severing device 50 has an arm 51 swingable horizontally over the support base 33 about a swing shaft 51a mounted on the support base 33 and connected to one end of the arm 51. A pair of guide bars or rails 52 on which a movable body 53 is movably mounted is fixed to the arm 51. The movable body 53 is threaded over a ball screw 55 extending parallel to the guide rails 52 and rotatable by a motor 54. The movable body 53 is moved along the guide rails 52 in response to rotation of the ball screw 55 upon energization of the motor 54. As the movable body 53 is moved along the guide bars 52, the movable body 53 and the arm 51 are automatically angularly moved in unison around the swing shaft 51a, as described later on.

Figure 11:
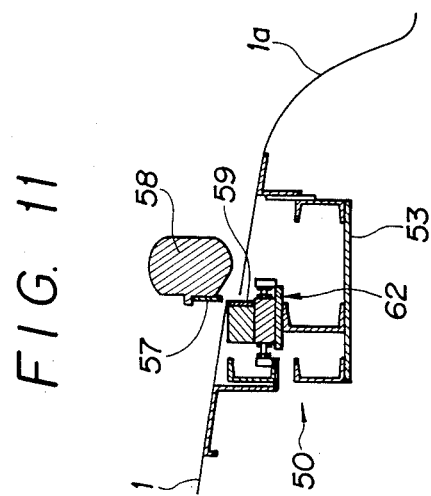
FIG. 11 is a fragmentary cross-sectional view of the device for severing a resin sheet.
Figure 5:
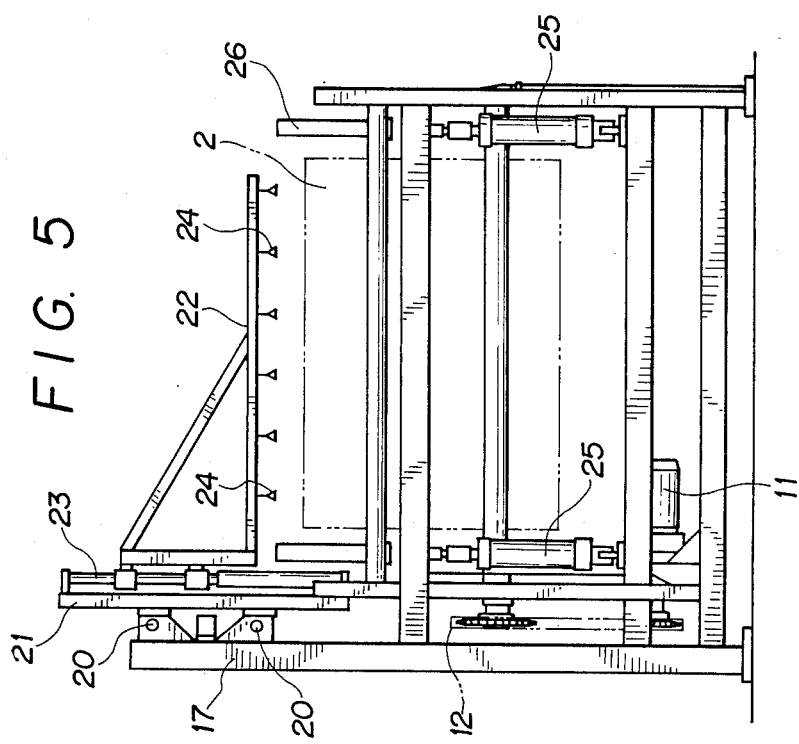
FIG. 5 is a view as viewed in the direction of the arrow V in FIG. 3.

A motor 56 is mounted on the movable body 53. The motor 56 is operatively connected to a shaft 58 having a cutting blade 57 which is also shown in FIG. 11. When the motor 56 is energized, the fan-shaped resin sheet 1 is cut off between the cutting blade 57 and a coacting blade 59. The position of the coacting blade 59 with respect to the cutting blade 57 can be adjusted by a fine adjustment mechanism 62 having a spring.

As shown in FIG. 9, a pair of rails 61 is fixedly mounted on the support base 33. The rails 61 are inclined at an angle α to the arm 51 and the guide rails 52 of the severing device 50 when the movable body 53 is positioned farthest from the motor 54. Stated otherwise, the swing shaft 51a is displaced a certain distance from extensions of the rails 61. As illustrated in FIG. 10, a pin 60 is attached to the movable body 53, the pin 60 projecting downwardly and engaging between the rails 61.

The pin 60 functions as follows:

As described above with reference to FIG. 8, when the support base 33 is moved to the left from the position of FIG. 8, the radius of curvature of the sheet 1 as it is stretched by the stretching device 8 increases. At the same time, the movable body 53 of the severing device 50 is moved along the guide rails 52 toward the motor 54 into a position to sever the sheet 1. Because the pin 60 engages the inclined rails 61, the movable body 53 is moved downwardly (FIG. 9) a distance dependent on the distance which the movable body 53 is moved to the right. Therefore, the movable body 53 and the arm 51 are automatically turned clockwise in FIG. 9 about the swing shaft 51a. The cutting blade 57 and the coacting blade 59 are always aligned with the radial direction, i.e., the transverse direction, of the fan-shaped sheet 1. As a result, the sheet 1 that is stretched by the stretching device 8 is cut off into a fan-shaped intermediate film 1a by the severing device 50. The angle α between the rails 61 and the arm 51 is suitably determined dependent on the shape of the conical drums 34a, 34b, 34c.

The pair of rails 61 and the pin 60 may be replaced with a single rail and two pins which grip the single rail therebetween.

The feeding device 70 will now be described with reference to FIG. 12.

The feeding device 70 has a shaft 71 vertically mounted on the support base 33, and lower and upper plates 72, 73 are angularly movably supported on the shaft 71. The angular displacement of the lower plate 72 is limited by a cylinder unit 74. To the upper plate 73, there is coupled an arm 77 which can be turned by a motor 75 and a speed reducer 76 that are mounted on the lower plate 72. The motor 75, the speed reducer 76, and the arm 77 cause the upper plate 73 to turn cyclically in a horizontal plane as a crank mechanism. The upper plate 73 supports thereon a pair of pipe guides 78 through which a large-diameter pipe 79a of an extensible/contractible arm 79 slidably extends The extensible/contractible arm 79 comprises the larger-diameter pipe 79a, a medium-diameter pipe 79b slidably inserted in the larger-diameter pipe 79a, and a smaller-diameter pipe 79c slidably inserted in the medium-diameter pipe 79b. A motor 80 is mounted on the distal end of the larger-diameter pipe 79a for extending and contracting the medium-diameter pipe 79b and the smaller-diameter pipe 79c with respect to the larger-diameter pipe 79a through a rack-and-pinion mechanism (not shown) disposed in the pipe 79a.

A pair of chucks 81 is supported on the smaller-diameter pipe 79c for axial sliding movement therealong. The distance between the chucks 81 can be adjusted by an adjusting unit 82 having a ball screw 82a and a handle 83. The chucks 81 have sheet gripping fingers 81a, respectively, on their lower ends. The sheet gripping fingers 81a can be moved toward and away from each other under pneumatic pressure exerted through a hose 84a extending from a solenoid-operated valve 84.

The upper plate 73 further supports thereon a motor 85 and a gear 87 for transmitting driving power from the motor 85 to a crank arm 86. The crank arm 86 is pivotally attached to one end of a linear arm 88 with its opposite end pivotally mounted on a collar 88a fixedly disposed around the larger-diameter pipe 79a. Rotation of the motor 85 is transmitted via the gear 87 to the arms 86, 88 to rotate and turn these arms 86, 88 as a crank mechanism. As a result, the larger-diameter pipe 79a is reciprocally moved between the pipe guides 78.

The intermediate film 1a which is cut off to a fan shape by the severing device 50 is placed onto the stock table 9 in the manner described below.

First, the limit of angular displacement of the lower plate 72 toward the severing device 50 is determined by the cylinder unit 74. At the same time, the length of the extensible/contractible arm 79 is adjusted by the motor 80 so that when the lower plate 72 is turned to the determined limit of angular displacement, the chucks 81 are in a position to grip the leading end of the resin sheet 1. Therefore, when the lower plate 72 is brought to the limit position, the two chuck fingers 81a of the chucks 81 are aligned with the leading end of the resin sheet 1 in order to reliably grip the resin sheet 1 which is not yet cut off into an intermediate film 1a.

Then, the motors 75, 85 are energized in a given sequence to reciprocally turn the upper plate 73 in a horizontal plane and also to extend and contract the extensible/contractible arm 79. The reciprocating angular movement of the upper plate 73 causes the chucks 81 to move reciprocally between the severing device 50 and the stock table 9. The resin sheet 1 with its leading end gripped by the chucks 81 is cut off again by the severing device 50 when the upper plate 73 is turned a predetermined angle toward the stock table 9, so that an intermediate film 1a can be produced. Through reciprocating movement of the chucks 81 on the arm 79, the intermediate film 1a is delivered into a given position on the stock table 9, e.g., to a stopper (not shown) thereon. The chuck fingers 81a can be moved toward or away from each other by actuating or inactivating the solenoid-operated valve 84 with a signal from the control unit (not shown).

With the present invention, as described above, the strip-like resin sheet 1 can be stretched, severed, and fed onto the stock table 9 in successive steps. Even when the radius of curvature of the resin sheet 1 which is stretched to a fan shape by the stretching device 8 is varied, the positions of the severing device 50 and the feeding device 70 are automatically adjusted or varied to cut off and deliver an intermediate film 1a from the resin sheet 1. Accordingly, workers which would otherwise be required for cutting and feeding the resin sheet are no longer needed, and hence errors in dimensions of severed films are minimized. When an intermediate film 1a is stacked on the stock table 9, it is prevented from being wrinkled since the film 1a is automatically, but not manually, stacked. Consequently, the stretching and severing system 100 can process a strip-like resin sheet with increased efficiency.

In the stretching and severing system 100, the leading end of the next resin sheet 1 is automatically placed on and spliced to the trailing end of the preceding resin sheet 1 by the suction delivery device 18 and the splicing device 19. Therefore, the leading end of the next resin sheet can efficiently and accurately be spliced to the trailing end of the preceding resin sheet. Since the splicing device 19 fuses the sheet 1 together with the heaters 27, no special air ventilation device is necessary, and the working environment is improved.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. An apparatus for stretching and severing a strip-like resin sheet unwound from a sheet roll in a first direction to produce a product of a prescribed shape, said apparatus comprising:
   a support base movable in a second direction transverse to said first direction;
   a stretching device mounted on said support base and having forming members for stretching said strip-like resin sheet into a fan-shaped resin sheet;
   a severing device including cutting edges, the severing device mounted on said support base downstream of said stretching device in said first direction for severing said fan-shaped resin sheet on the cutting edges into said product, said severing device being angularly movable for aligning said cutting edges with a radial direction of said fan-shaped resin sheet in response to movement of said support base in said second direction; and
   a rotatable feeding device mounted on said support base downstream of said severing device in said first direction for feeding said product to a prescribed area, said feeding device having an extensible and contractible arm supporting a chuck for gripping the leading end of said fan-shaped resin sheet.

2. An apparatus according to claim 1, wherein said severing device comprises a first guide rail mounted on said support base, an arm having a swing shaft displaced a prescribed distance from said first guide rail, a first movable body movable on said arm, and a pin attached to said first movable body and engaging said first guide rail.

3. An apparatus according to claim 1, further including:
   a conveyor for conveying a preceding sheet roll nonrotatably to an unwinding position upstream of said stretching device in said first direction;
   a pinch roller disposed downstream of said unwinding position in said first direction for unwinding said strip-like resin sheet from said preceding sheet roll;
   said conveyor being capable of conveying a next sheet roll to said unwinding position when said resin sheet on said preceding sheet roll is about to be used up;
   a suction delivery device for pulling the leading end of a resin sheet on the next sheet roll which has been conveyed to said unwinding position, to a splicing position positioned between said pinch roller and said unwinding position; and
   a splicing device disposed in said splicing position for splicing the leading end of the resin sheet from said next sheet roll to the trailing end of the resin sheet from said preceding sheet roll in said splicing position.

4. An apparatus according to claim 3, further including a carriage for transferring said sheet roll to said conveyor while keeping said sheet roll in a prescribed posture.

5. An apparatus according to claim 1, wherein said forming members of said stretching device comprise a plurality of conical drums.

6. An apparatus according to claim 5, wherein said conical drums have respective central axes substantially normal to said first direction, whereby in response to movement of said support base in said second direction, said conical drums can be moved in said second direction to vary the radius of curvature of the resin sheet as it is stretched to a fan shape.

7. An apparatus according to claim 1 further comprising:
   a conveyor for conveying said sheet roll nonrotatably to an unwinding position upstream of said stretching device in said first direction;
   a pinch roller disposed between the unwinding position and the stretching device for unwinding said strip-like resin sheet from said sheet roll;
   said conveyor being capable of conveying a next sheet roll to said unwinding position when said resin sheet on said sheet roll is almost depleted;
   a suction delivery device for pulling a leading end of a resin sheet on the next sheet roll which has been conveyed to said unwinding position, to a splicing position positioned between said pinch roller and said unwinding position; and
   a splicing device comprising heater means for heating and fusing together the leading end of the resin sheet from the next sheet roll and a trailing end of the resin sheet from said sheet roll.

8. An apparatus according to claim 7, further including a carriage for transferring said sheet roll to said conveyor while keeping said sheet roll in a prescribed posture.

* * * * *